United States Patent
Saraga et al.

(10) Patent No.: US 6,745,125 B2
(45) Date of Patent: Jun. 1, 2004

(54) METHOD, AND RELATED SYSTEM AND APPARATUS, FOR PROVIDING TRAVEL-RELATED INFORMATION TO A MOBILE COMMUNICATIONS DEVICE

(75) Inventors: Peter Saraga, London (GB); Andrew T. Yule, Felbridge (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 210 days.

(21) Appl. No.: 10/003,067

(22) Filed: Nov. 2, 2001

(65) Prior Publication Data

US 2002/0062192 A1 May 23, 2002

(30) Foreign Application Priority Data

Nov. 17, 2000 (GB) .............................................. 0028029

(51) Int. Cl.⁷ .............................................. G01C 21/26
(52) U.S. Cl. ........................ 701/207; 701/200; 701/204; 455/456; 342/450
(58) Field of Search ................................. 701/207, 200, 701/204, 208, 211, 215; 455/456; 342/450; 340/995

(56) References Cited

U.S. PATENT DOCUMENTS

| | | | | |
|---|---|---|---|---|
| 5,446,465 A | * | 8/1995 | Diefes et al. | 342/357.08 |
| 5,959,577 A | * | 9/1999 | Fan et al. | 342/357.13 |
| 6,321,158 B1 | * | 11/2001 | DeLorme et al. | 701/201 |
| 6,427,101 B1 | * | 7/2002 | Diaz et al. | 701/33 |
| 6,449,485 B1 | * | 9/2002 | Anzil | 455/456 |

FOREIGN PATENT DOCUMENTS

| | | | |
|---|---|---|---|
| DE | 19514133 A | 1/1997 | |
| WO | WO9945732 | 9/1999 | H04Q/7/38 |
| WO | WO9963358 | 12/1999 | G01S/5/02 |
| WO | WO0024131 | 4/2000 | H04B/1/06 |

* cited by examiner

*Primary Examiner*—Thomas G. Black
*Assistant Examiner*—Arthur D. Donnelly
(74) *Attorney, Agent, or Firm*—Jack D. Slobod

(57) ABSTRACT

The invention provides for a method of providing travel-related information to a mobile communications device (12) comprising determining the opposition of the mobile communications device (12), deriving at least one signal at the mobile communications device (12) indicative of the position of the mobile communications device (12) and indicative of a travel-related request initiated at the mobile communications device (12), and including the steps of retrieving travel service information from a transport service provider and responding to the travel-related request by calculating location and time information of a travel service (14) serving to fulfil the request, and providing an output at the mobile communications device (12) of the calculated location and time information of the travel service (14).

21 Claims, 3 Drawing Sheets

METHOD, AND RELATED SYSTEM AND APPARATUS, FOR PROVIDING TRAVEL-RELATED INFORMATION TO A MOBILE COMMUNICATIONS DEVICE

The present invention relates to a method of providing travel-related information to a mobile communications device and comprising the steps of determining the position of the mobile communication device, deriving at least one signal at the mobile communications device indicative of the position of the mobile communications device and also indicative of a travel-related request.

Such a system is known, for example, from WO-A-99/63358 which discloses a method and device relating to a network position system and which, in one implementation, can allow for use of a mobile terminal to send position and time related data in addition to command functions such as a request for a taxi. A transport service provider such as a taxi company can then send data in reply to the mobile terminal confirming the booking and providing an anticipated waiting time before arrival of the requested taxi.

However, such a known system is disadvantageously limited in that it merely provides for the exchange of data such as confirmation of booking and likely arrival time. Such information is in any case currently available when simply ordering a taxi cab by way of a telephone call and so does not enhance the efficiency within which the transport service offered by the taxi cab firm can be enjoyed by a user.

When considering a wider range of potential transport services, and in particular public bus and train transport services, such modes of transport are often considered to exhibit drawbacks and disadvantages which severely limit their popularity, and thus use. Many such drawbacks and disadvantages arise in relation to the uncertainty concerning the transport service and the perceived high potential for wasted time spent in waiting for the required service at an appropriate pick-up point such as a bus stop or train station etc. Even if a potential user of the system has access to detailed time table information for the service, such information is most relevant only to those already located at the pick-up point, or those having a detailed knowledge of their own location in relation to the known pick-up point.

Such standard timetable information would therefore not prove to be of any great assistance, for travellers having little or no knowledge of the likely nearest transport pick-up point or in situations where, due to some failure or delay in the service, the detailed timetable information is no longer accurate or valid. Also, transport routes such as those adopted by road vehicles, for example buses, are often altered with no, or little, warning such that the re-routing of transport vehicles can also render standard timetable information inaccurate and invalid.

The present invention seeks to provide for a method, and related system and apparatus, for providing travel-related information and exhibiting an advantage over known such methods, systems and related apparatus.

According to one aspect of the present invention there is provided a method of the above defined type, characterised by the steps of retrieving travel service information from a transport service provider and responding to the travel-related request by calculating location and time information of a travel service serving to fulfil the travel-related request, and providing an output at the mobile communication device of the result of the calculation of the said location and time information of the travel service.

According to another aspect of the present invention, there is provided a communication system including a mobile communications device and arranged for providing travel-related information to the mobile communications device, comprising means for determining the position of the mobile communications device, means for deriving at least one signal at the mobile communications device indicative of the position of the mobile communications device and also indicative of a travel-related request initiated at the mobile communications device, and including means for retrieving travel service information from a transport service provider, and calculation means for responding to the travel related request for calculating location and time information of a travel service serving to fulfil the service travel-related request, and including output means at the mobile communications device for outputting the calculated location and time information of the potentially suitable travel service.

The method, and related system, of the present invention is particularly advantageously in that, irrespective of the particular location of the user, i.e. the owner of the mobile communications device, the present invention allows for such a user to receive information confirming the location of one, or indeed more, potentially suitable pick-up points whilst also confirming, for example, the time at which the transport service will arrive at the pick-up point. The user is then readily presented with information sufficient to allow for his/her initial travel to the pick-up point even if they are unfamiliar with their current locality whilst also presenting information concerning how long they might have to wait for the transport service to arrive at pick-up point. Such information can, for example, prove useful in determining whether the user might be able to perform any other actions, for example carry out some shopping tasks or obtain some refreshment, before meeting the transport service at the pick-up point. An improved user interaction with, for example, a public transport system is therefore provided. In rendering the public transport network more easily, and efficiently, used, such transport options should become more appealing to the general public and so should advantageously serve in increasing the scale of use of the public transport network.

The features of claims 2 and 9 have the advantage that, should the transport service, for whatever reason, deviate from its normal transport route or schedule, the real time monitoring of the transport service and the relaying of appropriate information responsive to such monitoring allows for the present invention to exhibit the advantages discussed above.

The features of claims 3 and 10 provide for further advantages in that the user of the mobile communications device is then provided with a clear indication as to whether it might in any case be likely to rendezvous with the travel service at the pick-up point.

The features of claims 4 and 11 further improve the efficiency of using, for example, a public transport network in that the user of the mobile communications device can be provided with a ready prompt as to when they should depart their current location in order to arrive at a timely fashion to rendezvous with the travel service at the pick-up point.

The features of claims 5 and 12 are advantageous in attempting to ensure that the user of the mobile communications device leaves sufficient time to arrive at the pick-up point in order to rendezvous with the travel service and the features of claims 6 and 13 allow for the above-mentioned advantages to be further enhanced through the selection of mode of transport that the user might adopt, for example travel by foot or by taxi, in order to arrive at the pick-up point.

The features defined in claims 7 and 14 further enhance the efficiency of the invention in that the operative of the travel service, i.e. the bus driver, can be made aware that it is likely that a potential customer is intending to rendezvous with the service at a particular pick-up point. Yet further, the bus driver can be provided with advance information confirming the intended destination of that potential passenger.

According to another aspect of the present invention there is provided a communications terminal for a data network and arranged to receive position information and a request for travel-related information from a mobile communications device, and arranged to calculate location and time information of a travel service for satisfying the travel-related request on the basis of the received information and travel service information originating from a transport service provider.

The calculations conducted in accordance with the method and system defined above, could therefore be conducted at a terminal of a data network remote from the mobile communications device such as, for example, an Internet Service Provider.

According to another aspect of the present invention there is provided a mobile communications device arranged to calculate position information and to receive a request for travel-related information, and further arranged to receive travel service information originating from a transport service provider, and arranged to calculate location and time information of a travel service for satisfying the travel-related request on the basis of the received travel service information and the calculated position information.

The calculations required in accordance with the method and system defined above can therefore be provided within the mobile communications device itself which is then arranged to conduct the said calculations on the basis of control data downloaded from a remote terminal.

As will be appreciated, the present invention finds particular application with mobile communication devices in the form of mobile telephones and, in particular, a GPS enabled mobile telephone. Of course, as an alternative, the position-calculation of the mobile communications device can be conducted by means of a triangulation process based upon the mobile telephone network base-stations. Also, the invention can advantageously be adapted such that the user need only insert a travel-related request relating to his/her end destination such that the calculations performed in accordance with the present invention can take account of any route connections and transfers that might be required.

Of course, the information output at the mobile communications device can be determined responsive to the nature of the communications network to which the mobile communications device is connected, and so can comprise a simple SMS text message or, as appropriate, or full internet service message for mobile telephones arranged to connect to an Internet Service Provider.

The invention is described further hereinafter, by way of example only, with reference to the accompanying drawings in which.

Figure 1:
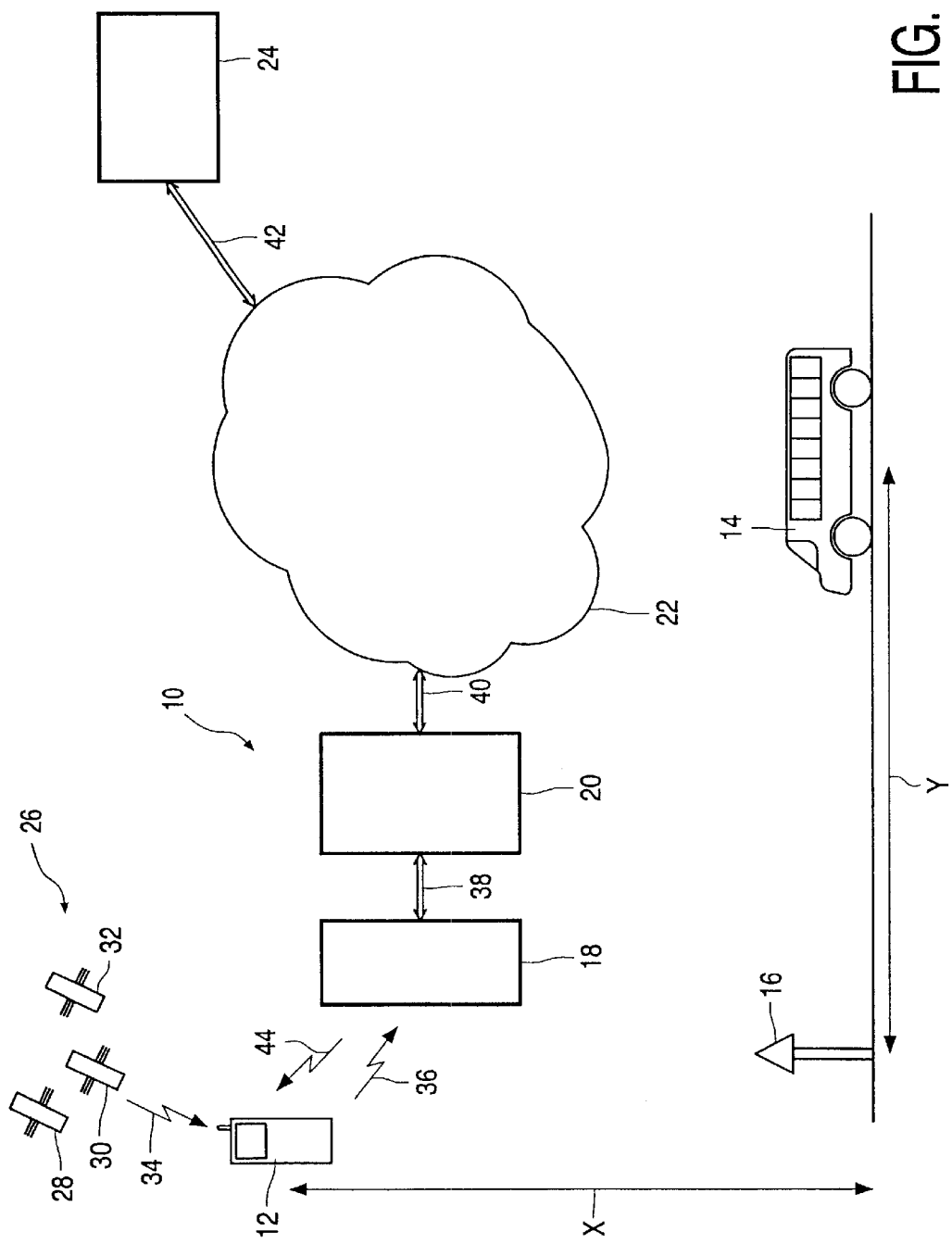
FIG. 1 is a schematic diagram illustrating a system according to an embodiment of the present invention.

Turning first to FIG. 1, there is illustrated a communication system 10 which, in accordance with an embodiment of the present invention, serves to allow for a mobile communications device such as a mobile telephone 12 to receive information concerning the travel service as represented by a bus 14 travelling in relation to its next pick-up point, a bus stop 16. In this illustrated example, the mobile telephone 12 is located within a cellular telephone network (illustrated further in FIG. 2) which employs a system controller 18 connected to a Public Switched Telephone Network (PSTN) 20. The PSTN 20 is, in this illustrated example, connected to the Internet 22 and can thus access an Internet Service Provider 24. The mobile telephone 12 is a GPS enabled mobile telephone which is therefore enabled to calculate position information based on the GPS system comprising a constellation 26 of GPS satellites, three of which, 28, 30, 32 are illustrated in FIG. 1. The mobile telephone 12 receives a positioning signal containing appropriate code sequences from the constellation of satellites 26 in accordance with processing well known in the art. The mobile telephone 12 thus has the capability to provide an output signal indicative of its location and is also arranged to output a signal responsive to an input from the user of the mobile telephone and which comprises a travel-related request. Such a request can be a request for any appropriate form of travel-related information and, in particular, can comprise a particular travel destination the user might want to travel to, or a particular travel route, the user might wish to follow. In the illustrated example, this travel-related request is output along with the mobile telephone position information 36 to the system controller 18 of the cellular telephone network and is subsequently delivered by way of the two-way data link 38 to the PSTN 20. The position data and request information is then delivered by way of a two-way data link 40 via the Internet 22 and a further two-way data link 42 to an Internet Service Provider 24 belonging to, or at least associated with, a transport service provider such as an operating or coordinating company for a particular transport service, for example a bus or train service.

As described further below, the Internet Service Provider 24 serves to calculate a response to the mobile telephone 12 user's request on the basis of information indicative of the current state of the travel service offered by the transport service provider and, more importantly, on the basis of the position information received from the mobile telephone 12.

In the illustrated example, a common request might be a request as to how to locate an appropriate pick-up point for a particular travel service that can take the user to its final, or intermediate, destination. The request might also initiate a response of how much time will elapse before the travel service arrives at the pick-up point. As mentioned above, in the illustrated example in FIG. 1, the travel service comprises a bus 14 which is approaching the next bus stop 16 on its route and so the answer to the user's request is calculated on the basis of the information now available at the Internet Service Provider 24. The calculated answer can then serve to confirm the distance X of the mobile telephone 12, and thus the user, to the bus stop 16 and also the time Y before the bus 14 arrives at the bus stop 16. Of course, further functionality can be readily provided within the mobile telephone 12, in that a graphical display confirming the route to the bus stop 16 can also be provided. In accordance with further features of this embodiment of the present invention, the response to the user's request can also calculate the length of time it is likely to take the user to travel to the bus stop 16. To this end, the system can also be arranged to receive additional input from the user confirming whether the user intends to travel on foot, or perhaps by some other mode of transport, for example bicycle or taxi, to the bus stop 16. The user can of course also readily determine whether there might be sufficient time to, for example, obtain some refreshment on route to the bus stop 16 and, further, the system can also provide for a mobile communications device to be located in the bus 14 so that the driver of the bus 14 can be alerted to the fact that a passenger should be expected at the bus stop 16.

Figure 2:
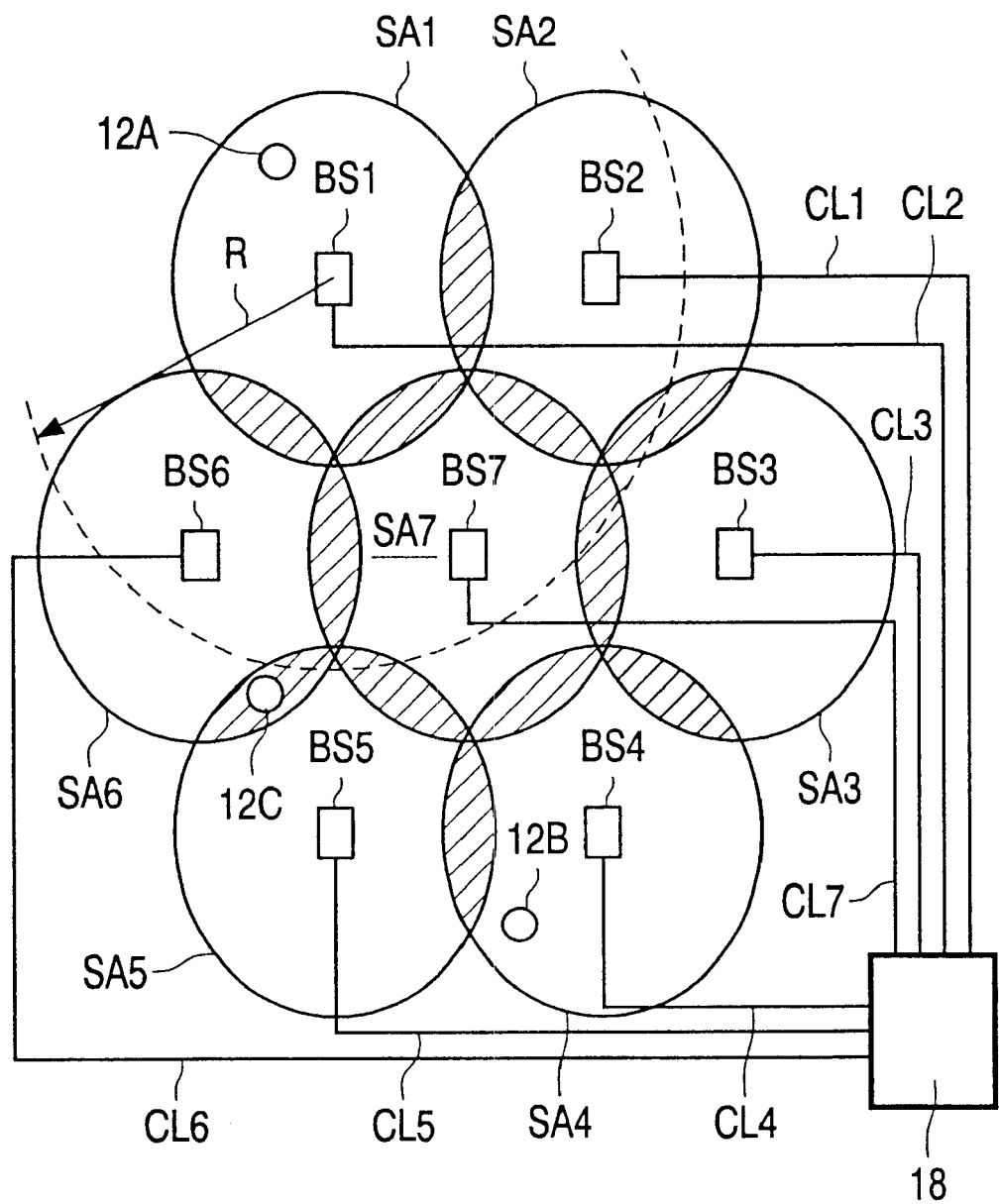
FIG. 2 is a schematic representation of the geographical lay out of a cellular telephone network for adoption in accordance with an embodiment of the present invention.

Turning now to FIG. 2, there is provided a clearer illustration of the cellular telephone network within which the mobile telephone 12 and system control 18 of the system illustrated in FIG. 1 are employed.

The geographical layout of a cellular telephone network is shown schematically in FIG. 2. The network comprises a plurality of base stations BS of which seven, BS1 to BS7, are shown, situated at respective, mutually spaced geographical locations. Each of these base stations comprises the entirety of a radio transmitter and receiver operated by a trunking system controller at any one site or service area. The respective service areas SA1 to SA7 of these base stations overlap, as shown by the cross hatching, to collectively cover the whole region shown. The system may furthermore comprise a system controller 18 such as that of FIG. 1 provided with a two-way communication link, CL1 to CL7 respectively, to each base station BS1 to BS7. Each of these communication links may be, for example, a dedicated land-line. The system controller 18 is, furthermore, connected to the public switched telephone network 20 (not shown in FIG. 2) to enable communication to take place between the mobile cellular telephone 12 and a subscriber to that network 20. A plurality of mobile cellular telephones can of course be supported within the telephone network and of which three, 12A–12C are shown, each being able to roam freely throughout the whole region, and indeed outside it.

Figure 3:
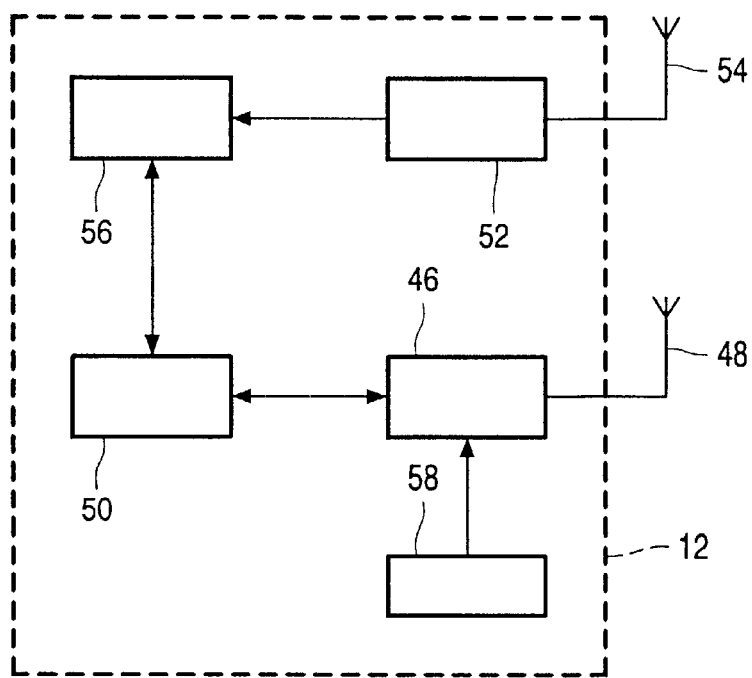
FIG. 3 is a schematic representation of a mobile cellular telephone such as that for use in the illustrated embodiment of the present invention.

Referring now to FIG. 3, mobile cellular telephone 12 is shown in greater detail as including communications transmitter/receiver 46 connected to a communications antenna 48 and controlled by a communications microprocessor 50 for communication with the base station BS1 with which it is registered. The design of such telephones for two-way communication within a cellular telephone network is well known and will not be elaborated upon further here.

In addition to the conventional components, the mobile telephone 12 further comprises a GPS receiver 52 connected to a GPS antenna 54 and controlled by a GPS microprocessor 56 for receiving GPS spread spectrum signals transmitted from the constellation 26 of orbiting GPS satellites. The GPS receiver 52 may receive NAVSTAR SPS GPS signal through an antenna 54 and pre-process them, typically by passive bandpass filtering in order to minimise out-of-band RF interference, pre-amplification, down conversion to an intermediate frequency (IF) and analog to digital conversation. The resultant, digitised, IF signal remains modulated and contains all the information from the available satellites, and is fed into a memory of the GPS microprocessor 56. The GPS signals may then be acquired and tracked for the purpose of deriving pseudorange information. Such methods for GPS signal acquisition and tracking are well known and so are not discussed further here. The GPS microprocessor 56 may be implemented in the form a general purpose microprocessor, in common with the communications microprocessor 50 or in a microprocessor embedded in a GPS application specific integrated circuit (ASIC). The end result of such processing is that the mobile telephone can then output a signal to the base stations BS1 which contains and indication of the position of the mobile telephone 12 and thus the user.

As part of the data input arrangement of the mobile telephone 12, there is provided a module 58 by which the user can input a travel-related request such as a desired final, or intermediate, location. A signal relaying such a request is then output via the communications antenna 40 to the base station BS1. Thus in accordance with the illustrated embodiment of the invention, the mobile telephone is arranged to output at least one signal comprising a travel-related request and positional information.

Returning to FIG. 1, the signal output from the mobile telephone 12 is sent to the system controller 18 for onward dispatch via the PSTN 20, the internet connection 22 and then, in the illustrated example, on to the Internet Service Provider 24. The Internet Service Provider 24 can be arranged to provide for a web-based application which, in addition to receiving the combined travel-related request and positional information derived from the mobile telephone 12, can also readily access travel-related information from a transport service provider. Indeed, in one example, the Internet Service Provider 24 can be that of, or managed by, a transport service provider. In any case, the Internet Service Provider 24 can serve to calculate a reply to the travel-related request originating from the mobile telephone 12 on the basis of the now known positional information of the mobile telephone 12 and the travel-related information of, for example, a specific travel service, for example bus service or train service that is likely to be most appropriate for use by the user of the mobile telephone 12 in satisfying the user's travel-related request.

For example, the travel-related request might simply be the identification of a final destination and the Internet Service Provider 24 can then provide for the calculation of the particular mode of transport that will be most appropriate to satisfy the user's request and return to the user via the communication links illustrated in FIG. 1 so as to illustrate at the mobile telephone how the user can most appropriately rendezvous with that mode of transport from its current position. That is, an indication of the direction to take to the nearest pick-up point such as a bus stop and also a clear indication as to the time of next arrival of, for example, the bus at that bus stop can be given. Various additional prompts can then be given to the user so as ensure that the user leaves adequate time to travel from his/her current position to the bus stop in order to rendezvous with the bus stop.

Figure 4:
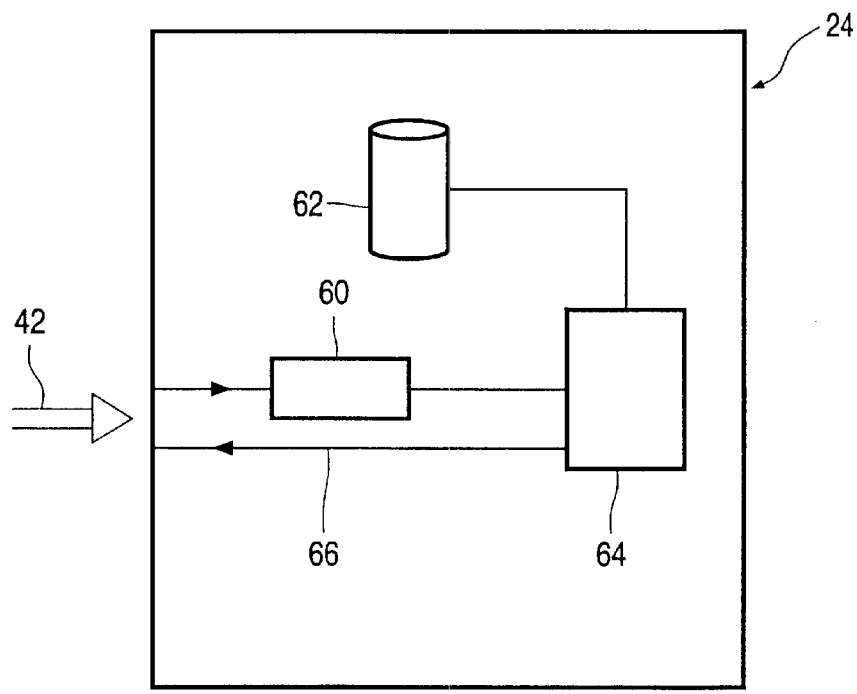
FIG. 4 is a block diagram of an Internet Service Provider arranged for use in accordance with the illustrated embodiment of the present invention.

FIG. 4 is a block diagram serving to illustrate schematically the functionality provided at the Internet service provider 24 of FIG. 1. As illustrated, the Internet service provider 24 is arranged to receive, and deliver, signals via the two-way data link 42 and includes a receiver section 60 for receiving the travel-related request information and positional information originating from the mobile telephone 12. The Internet Service Provider 24 is further associated with a data base of travel-related information including, for example, a map storage area 24 which, along with the receiver 60 is connected to a processor 64. The processor 64 serves to calculate a response to the travel-related request based primarily on the position information originating from the mobile telephone 12 and the latest known appropriate data held in the data base 62. The result is then output from the processor 64 via the output connection 66 for delivery via the two-way data link 42 and the Internet connection illustrated in FIG. 1 back to the user via the mobile telephone 12.

As will therefore be appreciated, the present invention provides for the use of positioning technology that can advantageously serve to improve the efficiency of a public transport system. The advantages result from the availability now made of the calculated position of a mobile terminal at a service provider seeking to provide an appropriate transport service such that the user can be provided with full and detailed information concerning the most efficient manner by which the user can use the transport service provided. A particular example of such functionality is represented by the following steps:

First, a user located in a shop receives a reply acknowledging the request to travel and indicating that a suitable bus will be passing the shop's main doors in 15 minutes time (the message could also indicate other details of the journey such as the bus number/colour and the expected arrival time and price).

Secondly, given this information, the user might decide to take refreshment at the coffee shop whilst they "wait" for the bus.

Thirdly, as the bus approaches the shop's main doors, the user receives a "reminder" to indicate that the bus is approaching.

Fourthly, the user moves to the shop's main doors as the bus pulls up.

Lastly, the bus driver has already received an indication of the passenger's destination and so can stop at the optimum place to drop them off and/or remind them to get off.

It should of course be appreciated that all the above-mentioned illustrations of the present invention are merely schematic in nature and the present invention is not restricted to the details of these illustrated embodiments. For example, the database 62 can be provided by means of a local storage combination of ROM and RAM storage devices or may in fact be remote from the Internet Service Provider 24 and accessed by means of a separate web application. In this manner the Internet Service Provided 24 can advantageously be associated with a variety of different transport providers so as to increase the selection of travel-related information available and so increase the likelihood of providing the most appropriate response to the user. Also, the exact position of the mobile telephone 12 need not be calculated at the mobile telephone 12 itself but can rather also be calculated by means of the processor at the Internet service provider or by the mobile phone network. Likewise, once having achieved an appropriate software download from the Internet connection illustrated in FIG. 1 to the mobile telephone 12, the mobile telephone 12 can alternatively be enabled to conduct a local calculation serving to answer the user's travel-related request.

What is claimed is:

1. A method of providing travel-related information to a mobile communications device comprising the steps of:
   determining the position of the mobile communications devices;
   deriving at least one signal at the mobile communications device indicative of the position of the mobile communications device and also indicative of the position of the mobile communication device and also indicative of a travel-related request initiated at the mobiles communications device;
   retrieving travel service information from a transport service provider;
   responding to the travel-related request by calculating location and time information of a travel service serving to fulfill the request;
   providing an output at the mobile communications device of the calculated location and time information of the travel service; and
   calculating the length of time it will take to travel from a current position of the mobile communications device to a point of rendezvous with the travel service.

2. A method as claimed in claim 1 wherein the travel service information retrieved from the transport service provider comprises real-time information related to the travel service.

3. A method as claimed in claim 1 including the steps of displaying the length of time it will take to travel from the current position of the mobile communications device to a point of rendezvous with the travel service.

4. A method as claimed in claim 1 including the step of calculating and indicating at the mobile communications device when the user of the mobile communications device should depart its current location so as to arrive at the point of rendezvous with the travel service.

5. A method as claim in claim 4 and including the steps of providing a plurality of such reminders.

6. A method as claimed in claim 2, and including the step of inputting information at the mobile communications device confirming the mode of travel that is to be used to travel to rendezvous with the travel service.

7. A method as claimed in claim 1, and including the step of informing an operative of the transport service of the existence of a potential passenger likely to arrive at one or more potential rendezvous points with the travel service.

8. A communication system including a mobile communications device and arranged for providing travel-related information to the mobile communication device, comprising:
   means for determining the position of the communications device;
   means for deriving at least one signal at the communications device indicative of the position of the mobile communications device and also indicative of a travel-related request initiated at the mobile communications device;
   means for retrieving travel service information from a transport service provider;
   calculation means for responding to the travel-related request for calculating location and time information of a travel service serving to fulfill the request;
   means for providing an output at the mobile communications device of the calculated location and time information of the travel service; and
   means for calculating the length of time it will take to travel from a current position of the mobile communications device to a point of rendezvous with the travel service.

9. A system as claimed in claim 8 wherein the travel service information retrieved from the transport service provider comprises real-time information related to the travel service.

10. A communication system as claimed in claim 8 including the step of displaying the length of time it will take to travel from the current position of the mobile communications device to a point of rendezvous with the travel service.

11. A system as claimed in claim 8 and including means for calculating and displaying at the mobile communications device when the user of the mobile communications device should depart its current location so as to arrive the point of rendezvous with the travel service.

12. A system as claimed in claim 11 and arranged to provide a plurality of such reminders.

13. A system as claimed in claim 9, and arranged for the input of information confirming the mode of travel that is to be used to travel to a point of rendezvous with the travel service.

14. A system as claimed in claim 8, wherein the transport service is arranged to receive information concerning the existence of a potential passenger likely to arrive at one or more potential rendezvous points with the travel service.

15. A communications terminal for a data network arranged to receive positional information and a request for travel-related information from a mobile communications device and arranged to calculate location and time information of a travel service suitable for satisfying the travel-related request on the basis of the received information and travel service information originating from a transport service provider, and further arranged for calculating the length of time it will take to travel from the position of the mobile communications device to a point of rendezvous with the travel service.

16. A terminal as claimed in claim 15 and arranged such that the travel service information retrieved from the transport provider comprises real-time information related to the travel service.

17. A terminal as claimed in claim 15 including means for displaying of the length of time it will take to travel from a current position of the mobile communications device to a point of rendezvous with the travel service.

18. A terminal as claimed in claim 15 including the steps of calculating and indicating at the mobile communications device when the user of the mobile communications device should depart its current location so as to arrive at the point of rendezvous with the travel service.

19. A terminal as claimed in claim 18 and including means for indicating a plurality of such reminders.

20. A mobile communications device arranged to calculate position information and to receive a travel-related request and to receive travel service information originating from a transport service provider, and arranged to calculate location and time information of a travel service suitable for satisfying the travel-related request on the basis of the received information and the travel service information originating from a transport service provider, and arranged to calculate the length of time it will take to travel from a position of the mobile communications device to a point of rendezvous with the travel service.

21. A mobile communications device as claimed in claim 20 and arranged to calculate the location and time information of the travel service on the basis of processing software down from a remote source to the mobile communications device.

* * * * *